(12) United States Patent
Lee

(10) Patent No.: US 7,365,912 B2
(45) Date of Patent: Apr. 29, 2008

(54) COMPACT ZOOM LENS

(75) Inventor: Ki-woo Lee, Changwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 11/248,740

(22) Filed: Oct. 12, 2005

(65) Prior Publication Data
US 2006/0245075 A1   Nov. 2, 2006

(30) Foreign Application Priority Data
Apr. 30, 2005   (KR) .................. 10-2005-0036536

(51) Int. Cl.
*G02B 15/14* (2006.01)
*G02B 3/02* (2006.01)
(52) U.S. Cl. .............. 359/680; 359/681; 359/682; 359/683; 359/689; 359/716; 359/740; 359/753; 359/781; 359/784
(58) Field of Classification Search ........ 359/680–682, 359/683, 689, 716, 740, 753, 781, 784
See application file for complete search history.

(56) References Cited

U.S. PATENT DOCUMENTS

| | | | |
|---|---|---|---|
| 6,124,984 A * | 9/2000 | Shibayama et al. | 359/689 |
| 6,785,057 B2 * | 8/2004 | Ori | 359/689 |
| 6,888,683 B2 * | 5/2005 | Itoh | 359/683 |
| 7,092,170 B2 * | 8/2006 | Satori | 359/689 |
| 2004/0004772 A1 * | 1/2004 | Ohashi et al. | 359/689 |

FOREIGN PATENT DOCUMENTS

| | | |
|---|---|---|
| JP | 2000-111798 A | 4/2000 |
| JP | 2001-272602 A | 10/2001 |
| JP | 2002-277740 A | 9/2002 |
| JP | 2004-333767 A | 11/2004 |
| KR | 2003-0024550 A | 3/2003 |

* cited by examiner

*Primary Examiner*—Evelyn A. Lester
(74) *Attorney, Agent, or Firm*—Drinker Biddle & Reath LLP

(57) ABSTRACT

A compact zoom lens suitable for an imaging optical system using a solid-state image sensing device is provided. The zoom lens includes a first lens group having a negative refractive power, a second lens group having a positive refractive power, and a third lens group having a positive refractive power. The first through third lens groups are sequentially arranged from an object side toward an image side. The first, second, and third lens groups move when magnification changes from the wide-angle position to the telephoto position, and a refractive index $G1n$ of at least one lens element included in the first lens group satisfies $1.90 < G1n < 2.00$.

16 Claims, 14 Drawing Sheets

COMPACT ZOOM LENS

BACKGROUND OF THE INVENTION

This application claims the priority of Korean Patent Application No. 10-2005-0036536, filed on Apr. 30, 2005, in the Korean Intellectual Property Office, the disclosure of which is incorporated herein in its entirety by reference.

1. Field of the Invention

The present invention relates to a compact zoom lens, and more particularly, to a zoom lens which decreases the number of lenses needed by an imaging optical system using a solid-state image sensing device, thereby providing compact size and reducing overall length for the optical system while providing excellent telecentricity, high magnification, and high imaging performance.

2. Description of the Related Art

Generally, a zoom lens used in a still camera and a video camera requires excellent optical performance, high magnification, and compactness. Moreover, with the widespread use of electronic equipment such as a portable information terminal (e.g., a personal digital assistant (PDA)) and a mobile terminal, a digital camera or a digital video unit is increasingly installed in such electronic equipment. As a result, there is an increased demand for compactness of the camera module. In an optical system having a solid-state image sensing device, such as a charge coupled device (CCD) or a complimentary metal-oxide semiconductor (CMOS), which is used for electronic still cameras and video cameras, since a crystal filter is used to prevent a moire phenomenon caused by the periodic structure of the image sensing device, a sufficient back focal length and telecentricity of light incident onto an image surface are needed taking account of the thickness and position of the crystal filter. In addition, the sum of thicknesses of lenses and an overall optical length must be short to reduce the length for receiving the optical system.

An example of a conventional zoom lens using three-group zoom technology is the zoom lens disclosed in Japanese Patent Publication No. 2000-111798. This zoom lens has high imaging performance at high magnification. However, since a first lens group includes three lenses and the overall length of an optical system is long, it is difficult to make the zoom lens compact and thin.

Referring to FIG. 1, which illustrates a zoom lens disclosed in Japanese Patent Publication No. 2002-277740, the zoom lens sequentially includes a first lens group 10 having a negative refractive power, a second lens group 20 having a positive refractive power, and a third lens group 30 having a positive refractive power. The first lens group 10, the second lens group 20, and the third lens group 30 are moved to zoom in or out and a high zoom ratio is accomplished. However, a disadvantage of this zoom lens is that it requires an increase in the number of lenses and an increase in the thickness of each lens group. Even if the total number of lenses is decreased to 6, since the thickness of the second lens group 20 and the third lens group 30 is increased, it is difficult to make the zoom lens compact and thin.

A zoom lens disclosed in Japanese Patent Publication No.2001-272602 includes a first lens group having a negative refractive power, a second lens group having a positive refractive power, and a third lens group having a positive refractive power and changes power by changing the distance between the lens groups. The first lens group includes a single negative lens and a single positive lens. The second lens group includes a pair of doublets and a single positive lens. The third lens group includes at least one positive lens. Although this zoom lens achieves compactness, it does not achieve high magnification.

To achieve compactness of the camera module and the lens system, miniaturization is important. Furthermore, recently, providing a lens system that is thin is increasingly important.

SUMMARY OF THE INVENTION

The present invention provides a zoom lens which reduces the number of lenses needed by an imaging optical system using a solid-state image sensing device, thereby providing compact size of the optical system while providing excellent telecentricity, high magnification, and high imaging performance.

According to an aspect of the present invention, there is provided a zoom lens including a first lens group having a negative refractive power, a second lens group having a positive refractive power, and a third lens group having a positive refractive power. The first through third lens groups are sequentially arranged from an object side toward an image side and move from a wide-angle end to a telephoto end, and a refractive index G1n of at least one lens included in the first lens group satisfies $1.90 < G1n < 2.00$.

When the magnification changes from wide-angle to telephoto, the distance between the first lens group and the second lens group may decrease, the distance between the second lens group and the third lens group may increase, and the distance between the third lens group and a cover glass located at the image side may decrease.

The first lens group may include two lenses of which one lens has a positive refractive power, the second lens group may include three lenses of which at least two lenses are cemented forming a doublet, and the third lens group may include a single lens with a positive refractive power.

When the distance that the second lens group moves when the power changes from the wide-angle end to the telephoto end is represented by $L_{II}$, the focal length of the zoom lens optical system at the wide-angle end is represented by $f_w$, and the focal length of the zoom lens optical system at the telephoto end is represented by $f_t$, $$0.8 < \frac{L_{II}}{\sqrt{f_t f_w}} < 1.0$$

is satisfied.

When the distance that the second lens group moves when the power changes from the wide-angle end to the telephoto end is represented by $L_{II}$, the focal length of the second lens group is represented by $f_2$, and the refractive index of the lens element of the second lens group positioned closest to the object side is represented by G2n, $$0.45 < \frac{(L_{II}/f_2)}{G2n} < 0.6$$

is satisfied.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
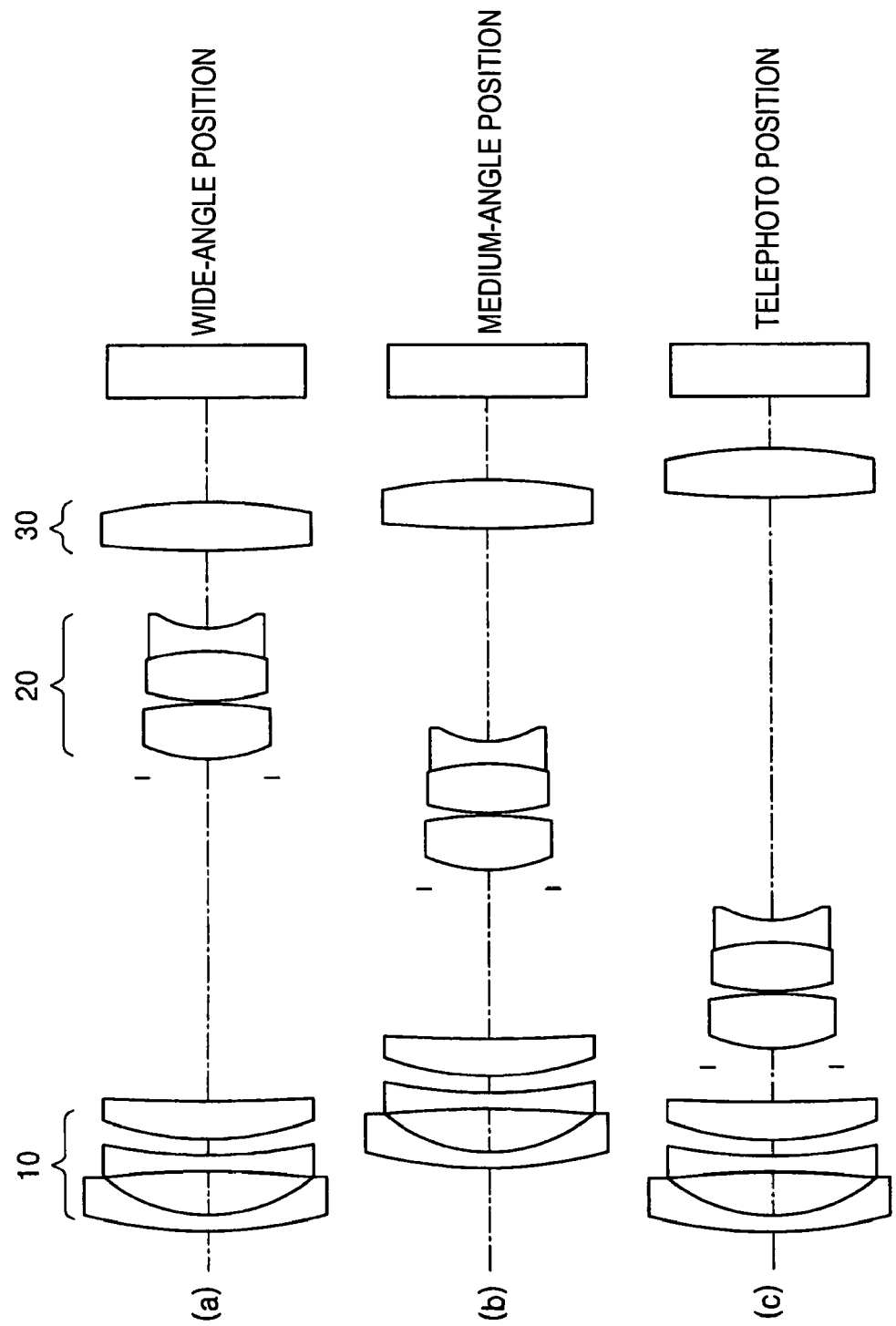
FIG. 1 illustrates a conventional zoom lens disclosed in Japanese Patent Publication No. 2002-277740.
Figure 2:
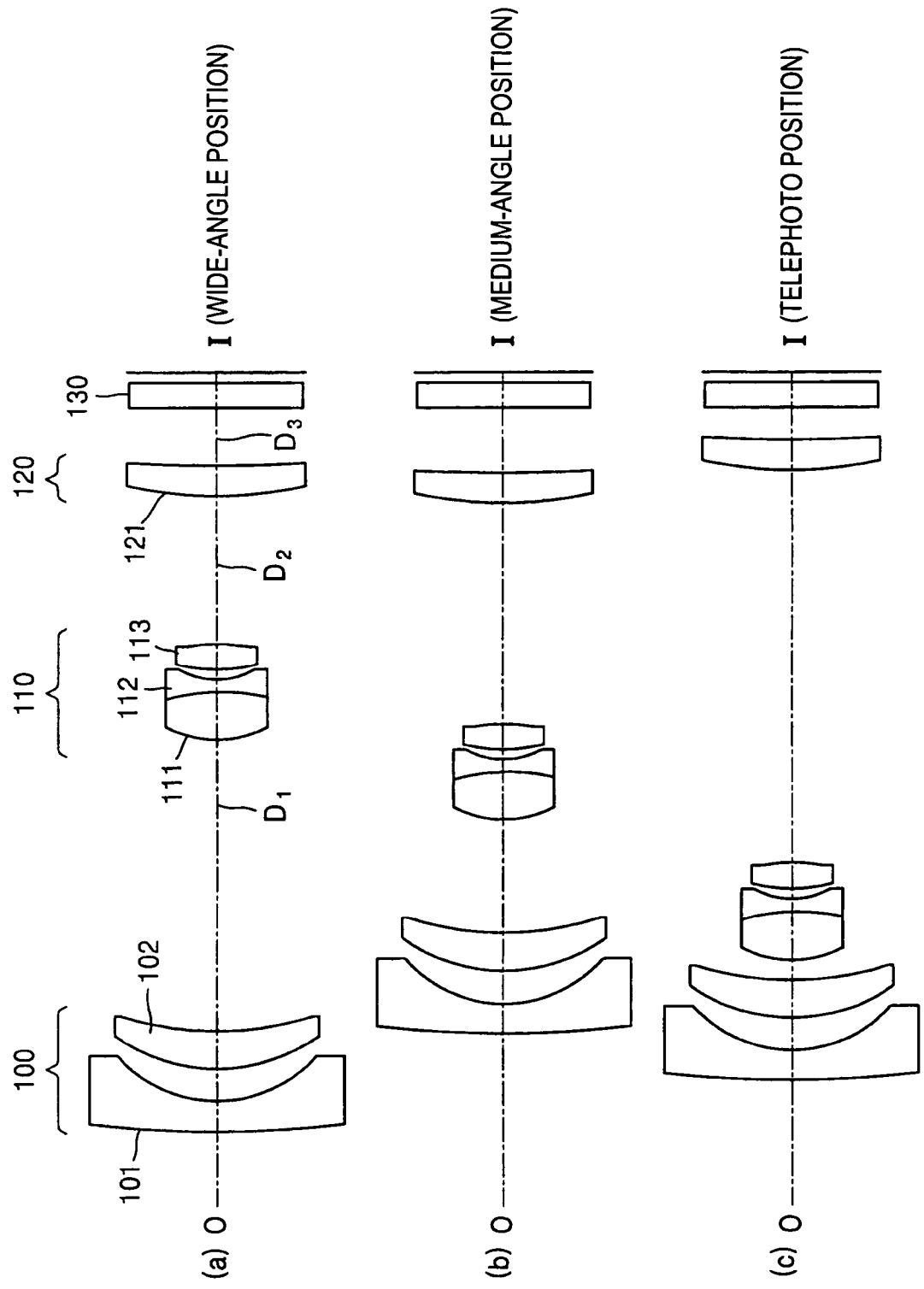
FIG. 2 illustrates a zooms lens system of the present invention at a wide-angle position, a medium-angle position, and a telephoto position.

FIG. 2 illustrates the position of the lens group of the lens system of the present invention at (a) a wide-angle position, (b) a medium-angle position, and (c) a telephoto position. Referring to FIG. 2, the zoom lens includes, from an object side O to an image side I, a first lens group 100 having a negative refractive power, a second lens group 110 having a positive refractive power, and a third lens group 120 having a positive refractive power. When magnification changes from wide-angle magnification to telephoto, the first, second and third lens groups 100, 110, and 120 move. The magnification is changed by moving the second lens group 110 and the shift of the image surface occurring during the change is compensated for by moving the first and third lens groups 10 and 120, thereby accomplishing high magnification. When the magnification changes from wide-angle to telephoto, the distance between the first lens group 100 and the second lens group 110 decreases, the distance between the second lens group 110 and the third lens group 120 increases, and the distance between the third lens group 120 and a stationary element, e.g., a filter or a cover glass 130, located at the image side I, decreases.

In the above-described system, satisfactory imaging performance can be obtained at a field angle of at least 60 degrees at the wide-angle position due to the first lens group 100 having a negative refractive power and the second lens group 110 having a positive refractive power. In addition, when the first lens group 100 is made using a lens having a high variance, conditions of a small chromatic difference in magnification needed for high resolution are satisfied. The first lens element of the second lens group 110 closest to the object side O is made using a material having a high refractive index so that a moving distance of the second lens group 110 needed during zooming is reduced. As a result, the overall length of an optical system is reduced.

Meanwhile, the third lens group 120 includes a convex lens having a positive refractive power so that a satisfactorily long back focal length can be obtained. To achieve telecentricity, i.e., to enable the chief ray of light flux from ambient objects to be incident onto an image sensing device at a right angle, it is necessary to locate an exit pupil as far as possible from the image sensing device. This can be satisfied by providing a long focal length.

In an embodiment of the present invention, the shift of an image surface due to the monotone movement of the second lens group 110 during zooming is compensated for by moving the first lens group 100 and the third lens group 120 non-linearly. Compensation of a focus position according to the position of an object, i.e., focusing, is performed by the third lens group 120. In focusing, the first and second lens groups may also be moved a little. As a result, the zoom lens according to the present invention is advantageous in miniaturizing a system.

The first lens group 100 includes two lens elements one of which has a positive refractive power. The second lens group 110 includes three lens elements at least two of which are cemented. The third lens group 120 includes a single lens element having a positive refractive power.

According to an embodiment of the present invention, the first lens group 100 includes a first lens element 101 and a second lens element 102. The second lens group 110 includes a third lens element 111, a fourth lens element 112, and a fifth lens element 113. The third lens group 120 includes a sixth lens element 121.

The refractive index G1n of at least one of the first and second lens elements 101 and 102 in the first lens group 100 may be in the range of Equation (1).

$$1.90 < G1n < 2.00 \tag{1}$$

The first lens group 100 includes a lens having a refractive index in the range of Equation (1) so that a chromatic difference of magnification is satisfactorily compensated for even at a zoom ratio of about 3. Among the lenses included in the first lens group 100, the second lens element 102 may have the refractive index in the range of Equation (1) and a positive refractive power. In addition, the first lens group 100 includes at least one lens element having an aspherical shape. The aspherical lens element minimizes distortion and provides imaging performance suitable for a high pixel count image sensing device.

The second lens group 110 includes a doublet in which a positive third lens element 111 is cemented to a negative fourth lens element 112 and a positive fifth lens element 113 so that refractive power is dispersed to obtain satisfactory optical performance with respect to an entire image of the object side O, providing imaging performance suitable for a high pixel count image sensing device.

Meanwhile, when the distance that the second lens group 110 moves when the power changes from wide-angle to telephoto is represented by $L_{II}$, the focal length of the zoom lens optical system at the wide-angle position is represented by $f_w$, and the focal length of the zoom lens optical system at the telephoto position is represented by $f_t$, Equation (2) is satisfied.

$$0.8 < \frac{L_{II}}{\sqrt{f_t f_w}} < 1.0 \quad (2)$$

Equation (2) defines a ratio of the moving distance of the second lens group 110 to a combined focal length between the wide-angle position and the telephoto position. When the ratio exceeds the maximum limit, the refractive power of the second lens group 110 decreases and the moving distance of the second lens group 110 from the wide-angle position to the telephoto end increases, and therefore, it is difficult to make the zoom lens thin. When the ratio is less than the minimum limit, the refractive power of the second lens group 110 increases, and therefore, it is difficult to obtain a necessary back focal length at the wide-angle end and compensate for spherical aberration, coma, and astigmatism at the telephoto position.

In addition, when the distance that the second lens group 110 moves when the power changes from wide-angle to telephoto is represented by $L_{II}$, the focal length of the second lens group 110 is represented by $f_2$, and a refractive index of the lens element of the second lens group 110 closest to the object side O is represented by G2n, Equation (3) is satisfied.

$$0.45 < \frac{(L_{II}/f_2)}{G2n} < 0.6 \quad (3)$$

Equation (3) defines a ratio of ($L_{II}/f_2$) to the refractive index of the lens element of the second lens group 110 closest to the object side O. When the defined ratio exceeds the maximum limit, the moving distance of the second lens group 110 increases, and therefore, it is difficult to make the zoom lens compact. On the other hand, the refractive index G2n of the lens element of the second lens group 110 closest to the object side O decreases and affects the radius of curvature of a positive lens of the second lens group at the object side O, and therefore, it is difficult to minimize spherical aberration and coma. When the defined ratio is less than the minimum limit, since the moving distance of the second lens group 110 decreases, it is difficult to accomplish high magnification. In another case, the refractive index G2n of the lens element of the second lens group 110 positioned closest to the object side O increases and goes beyond a preferable range, which will be described later.

When the overall length of the zoom lens system at the wide-angle position is represented by Dw and the focal length of the first lens group 100 is represented by $f_1$, Equation (4) is satisfied.

$$2.0 < \frac{Dw}{|f_1|} < 2.5 \quad (f_1 < 0) \quad (4)$$

Equation (4) defines a ratio of the overall length of the zoom lens optical system at the wide-angle position to the focal length of the first lens group 100. When the ratio defined by Equation (4) exceeds the maximum limit, since the overall length of the zoom lens optical system at the wide-angle position increases, it is difficult to make the optical system compact. When the ratio is less than the minimum limit, since the focal length of the first lens group 100 increases, it is difficult to compensate for distortion and astigmatism.

Meanwhile, when the overall focal length of the first lens group 100 is represented by $f_1$ and the overall focal length of the second lens group 110 is represented by $f_2$, Equation (5) is satisfied.

$$1.3 < \frac{|f_1|}{f_2} < 1.5 \quad (f_1 < 0) \quad (5)$$

Equation (5) defines a ratio of the focal length of the first lens group 100 to the focal length of the second lens group 110. When the ratio exceeds the maximum limit, the focal length of the second lens group 110 decreases, and therefore, it is difficult to compensate for spherical aberration and coma. When the ratio is less than the minimum limit, the overall length of the optical system increases, and therefore, it is difficult to make the optical system compact and thin.

Meanwhile, the refractive index G2n of the lens element of the second lens group 110 positioned closest to the object side O is in the range of Equation (6).

$$1.69 < G2n < 1.95 \quad (6)$$

Equation (6) is provided to accomplish a small moving distance of the second lens group 110 during zooming to provide a compact zoom lens optical system. When the refractive index exceeds the maximum limit, the lens has a high refractive index, which incurs costly and difficult manufacturing. When the refractive index is less than the minimum limit, the moving distance of the second lens group 110 increases, and therefore, it is difficult to make the zoom lens optical system compact.

When the power of a zoom lens according to the present invention changes from the wide-angle position to the telephoto position, Equation (7) is satisfied.

$$2.7 < \frac{f_t}{f_w} < 3.0, \quad (7)$$

where $f_w$ is the focal length at the wide-angle position and $f_t$ is the focal length at the telephoto position. Equation (7) defines a ratio of the focal length at the telephoto position to the focal length at the wide-angle position. When the ratio exceeds the maximum limit, it is difficult to make the zoom lens compact. When the ratio is less than the minimum limit, it is difficult to accomplish high magnification.

The following describes the definition of an aspherical shape used in embodiments of the present invention.

The aspherical shape of the aspherical lens element of the zoom lens according to the embodiments of the present invention can be expressed by Equation (8) when an optical axis is set as an X-axis, a line perpendicular to the optical axis is set as a Y-axis, and a progressing direction of a light beam is defined as being positive.

$$x = \frac{cy^2}{1+\sqrt{1-(K+1)c^2y^2}} + Ay^4 + By^6 + Cy^8 + Dy^{10}, \quad (8)$$

where "x" is a coordinate from a vertex of a lens in an X-axis direction, "y" is a coordinate from the vertex of the lens in a Y-axis direction, and K is a conic constant. A, B, C, and D are aspheric coefficients, and "c" is a reciprocal of the radius of curvature, 1/R, at the vertex of the lens.

In various embodiments of the present invention, a zoom lens includes lenses satisfying optimizing conditions for miniaturization of the zoom lens. Detailed lens data used for a zoom lens in various embodiments of the present invention will be described below.

Hereinafter, "f" denotes a combined focal length of an entire lens system, Fno denotes an F number, ω denotes a field angle, R denotes a radius of curvature, "Dn" denotes a thickness of a center of a lens or a distance between lenses, ND denotes a refractive index, VD denotes an Abbe's number, ST denotes a diaphragm or aperture stop, and D1, D2, and D3 denote variable distances between lenses.

First Embodiment

Figure 3:
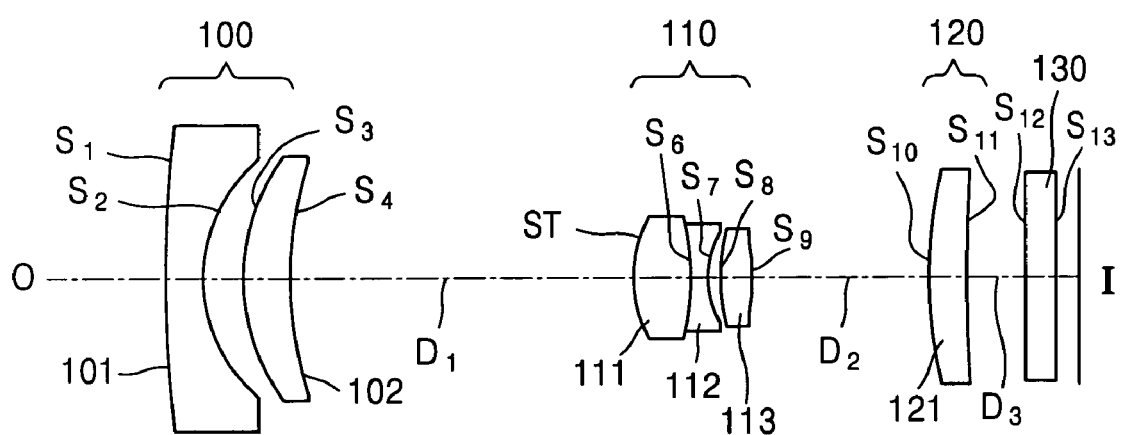
FIG. 3 illustrates a zoom lens according to a first embodiment of the present invention.

FIG. 3 illustrates a zoom lens according to a first embodiment of the present invention. A first lens group 100 includes a first lens element 101 and a second lens element 102. A second lens group 110 includes a third lens element 111, a fourth lens element 112, and a fifth lens element 113. A third lens group 120 includes a sixth lens element 121. Reference numeral 140 denotes a cover glass.

Table 1 shows examples of the variable distances D1, D2, and D3 at the wide-angle position, the medium-angle position, and the telephoto position in the zoom lens according to a first embodiment of the present invention.

TABLE 1

|  | Wide-angle | Medium-angle | Telephoto |
|---|---|---|---|
| D1 | 12.179 | 4.777 | 0.900 |
| D2 | 6.219 | 9.189 | 16.330 |
| D3 | 2.032 | 2.402 | 1.000 |

Figure 4A:
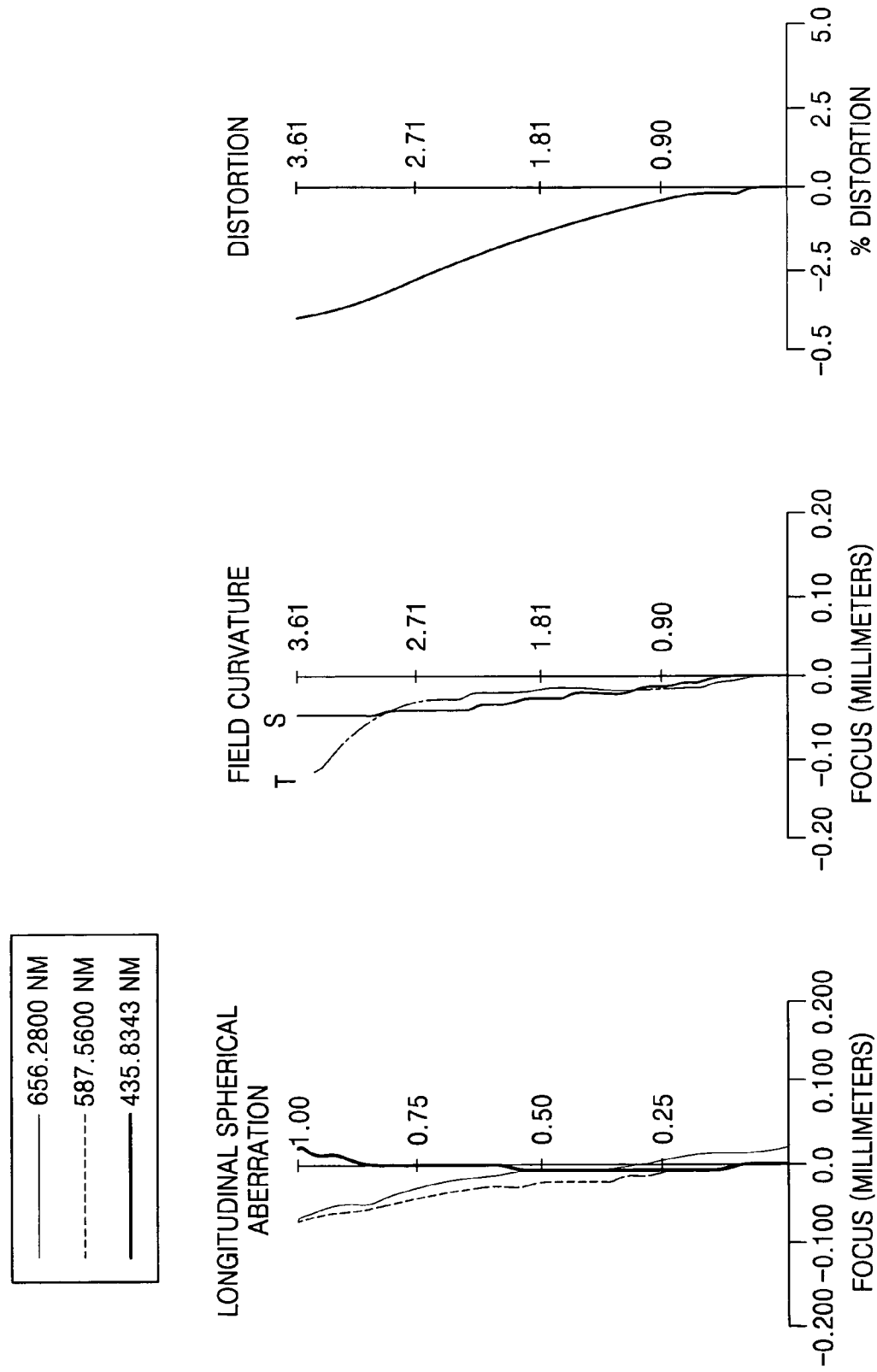
FIG. 4A illustrates longitudinal spherical aberration, field curvature, and distortion at the wide-angle position of the zoom lens according to the first embodiment of the present invention.
Figure 4B:
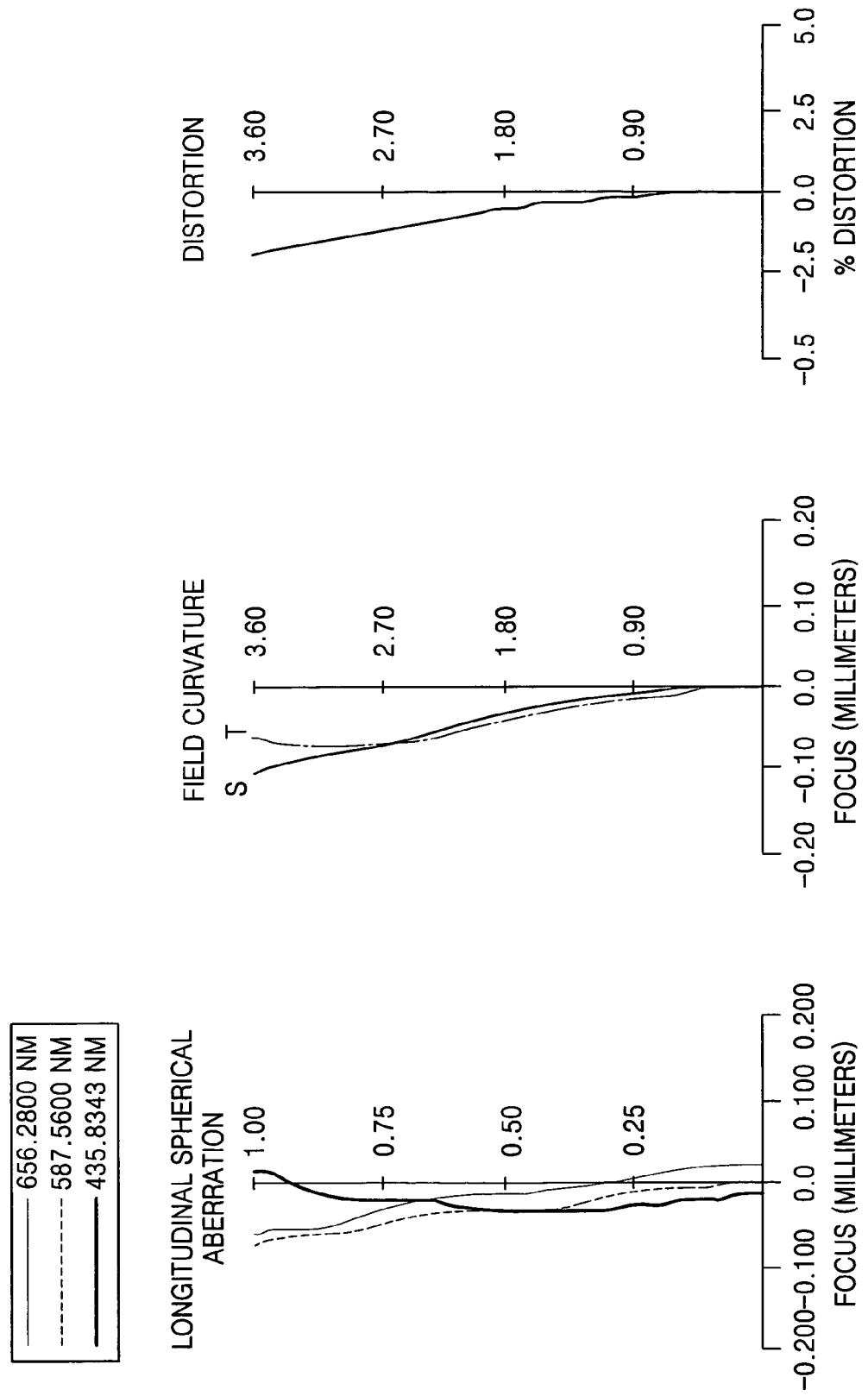
FIG. 4B illustrates longitudinal spherical aberration, field curvature, and distortion at the medium-angle position of the zoom lens according to the first embodiment of the present invention.
Figure 4C:
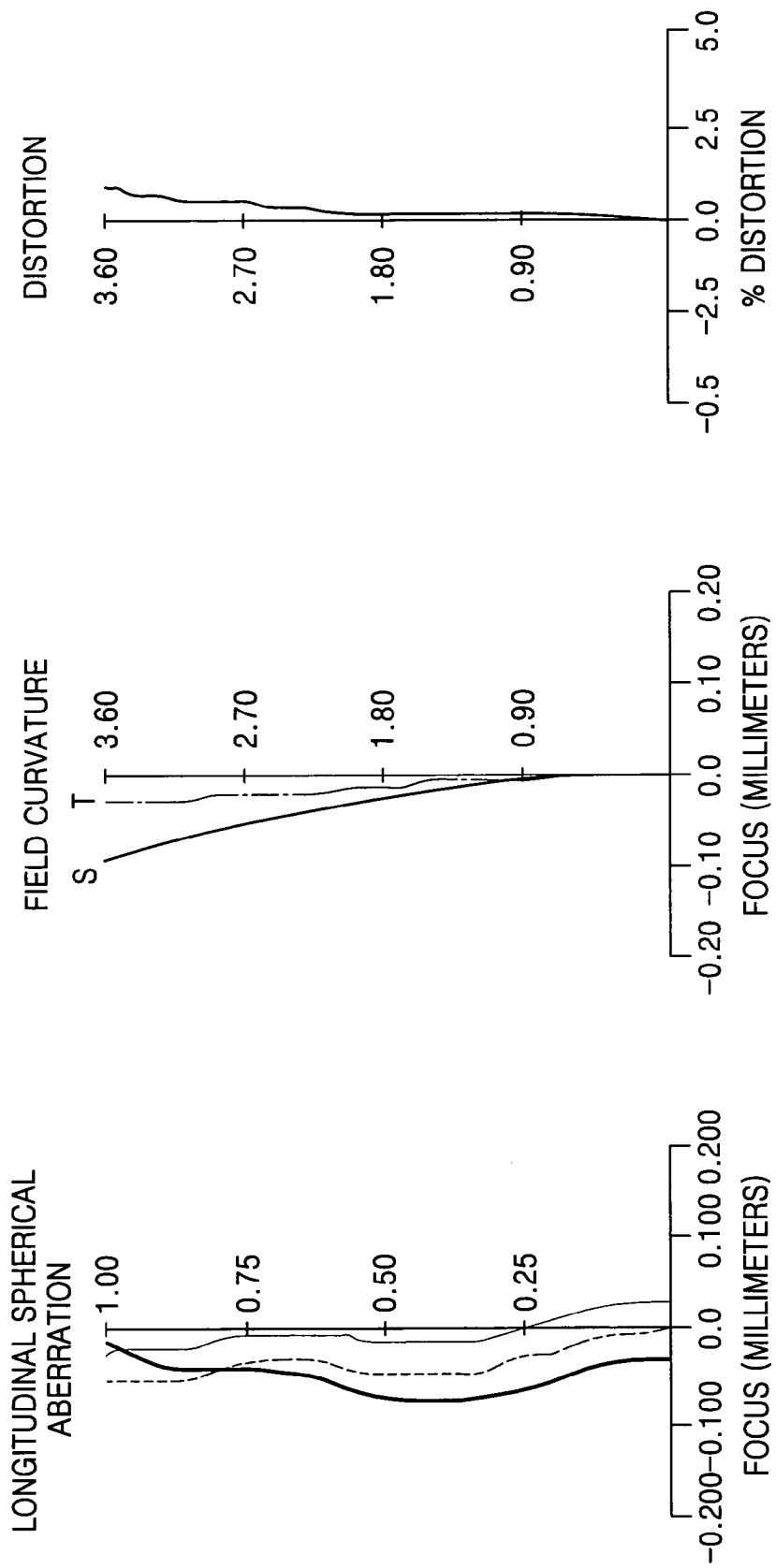
FIG. 4C illustrates longitudinal spherical aberration, field curvature, and distortion at the telephoto position of the zoom lens according to the first embodiment of the present invention.

FIGS. 4A through 4C illustrate longitudinal spherical aberration, field curvature, and distortion at the wide-angle position, the medium-angle position, and the telephoto position of the zoom lens according to the first embodiment of the present invention.

Second Embodiment

Figure 5:
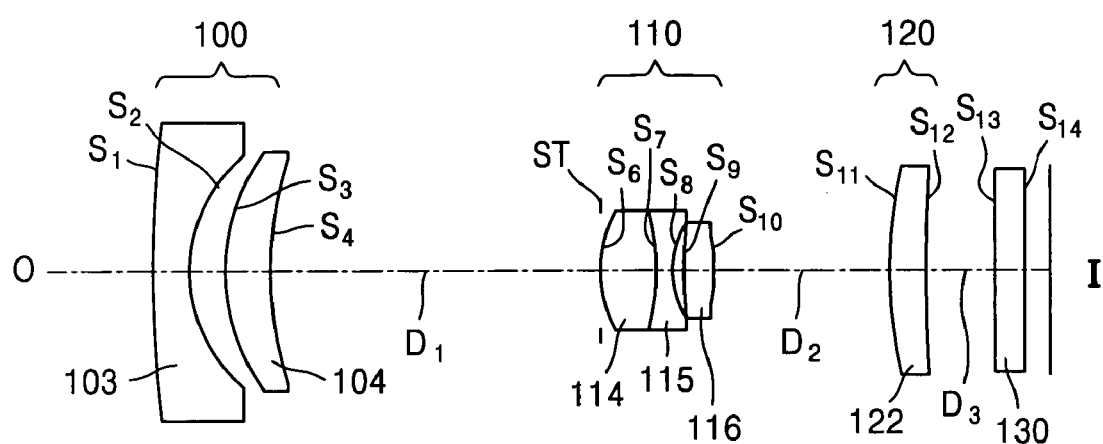
FIG. 5 illustrates a zoom lens according to a second embodiment of the present invention.
Figure 6A:
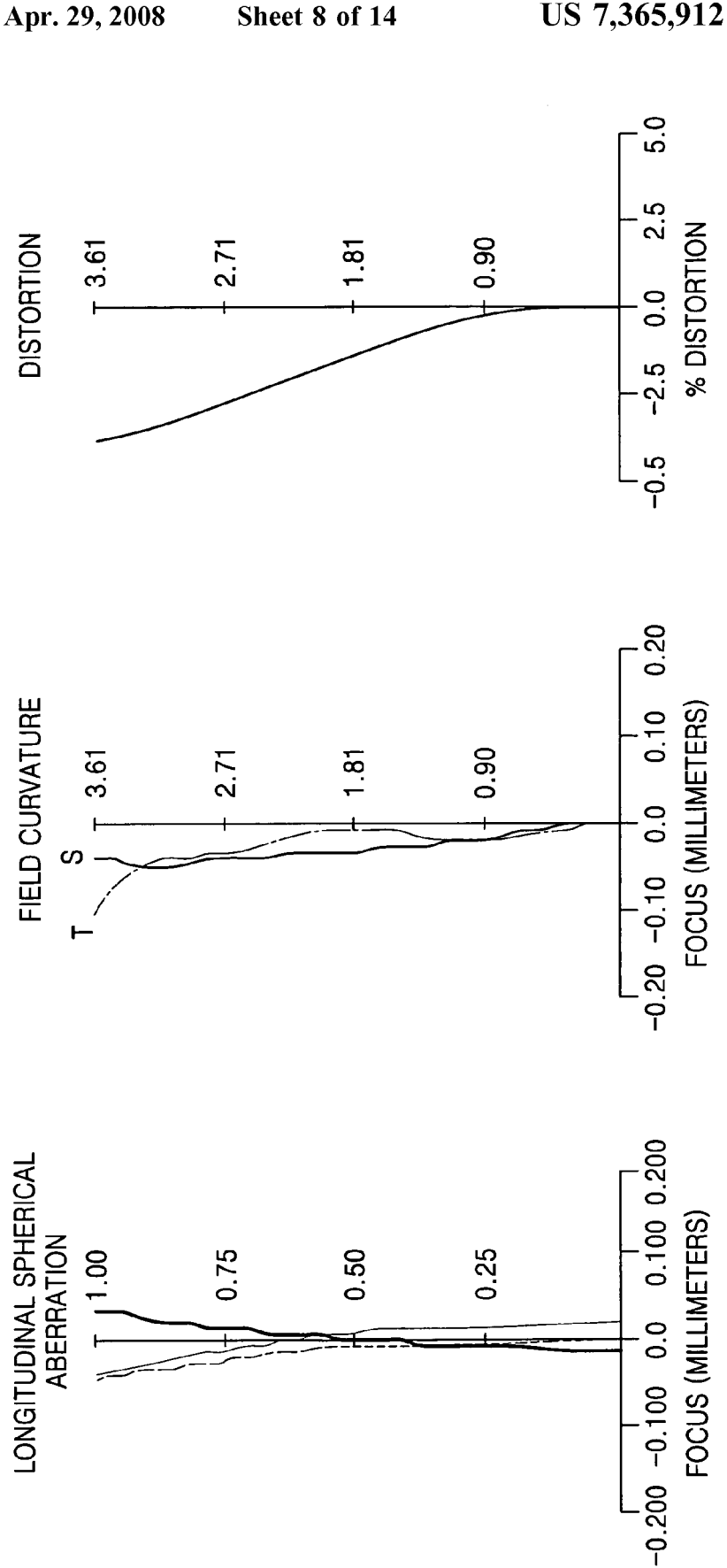
FIG. 6A illustrates longitudinal spherical aberration, field curvature, and distortion at the wide-angle position of the zoom lens according to the second embodiment of the present invention.
Figure 6B:
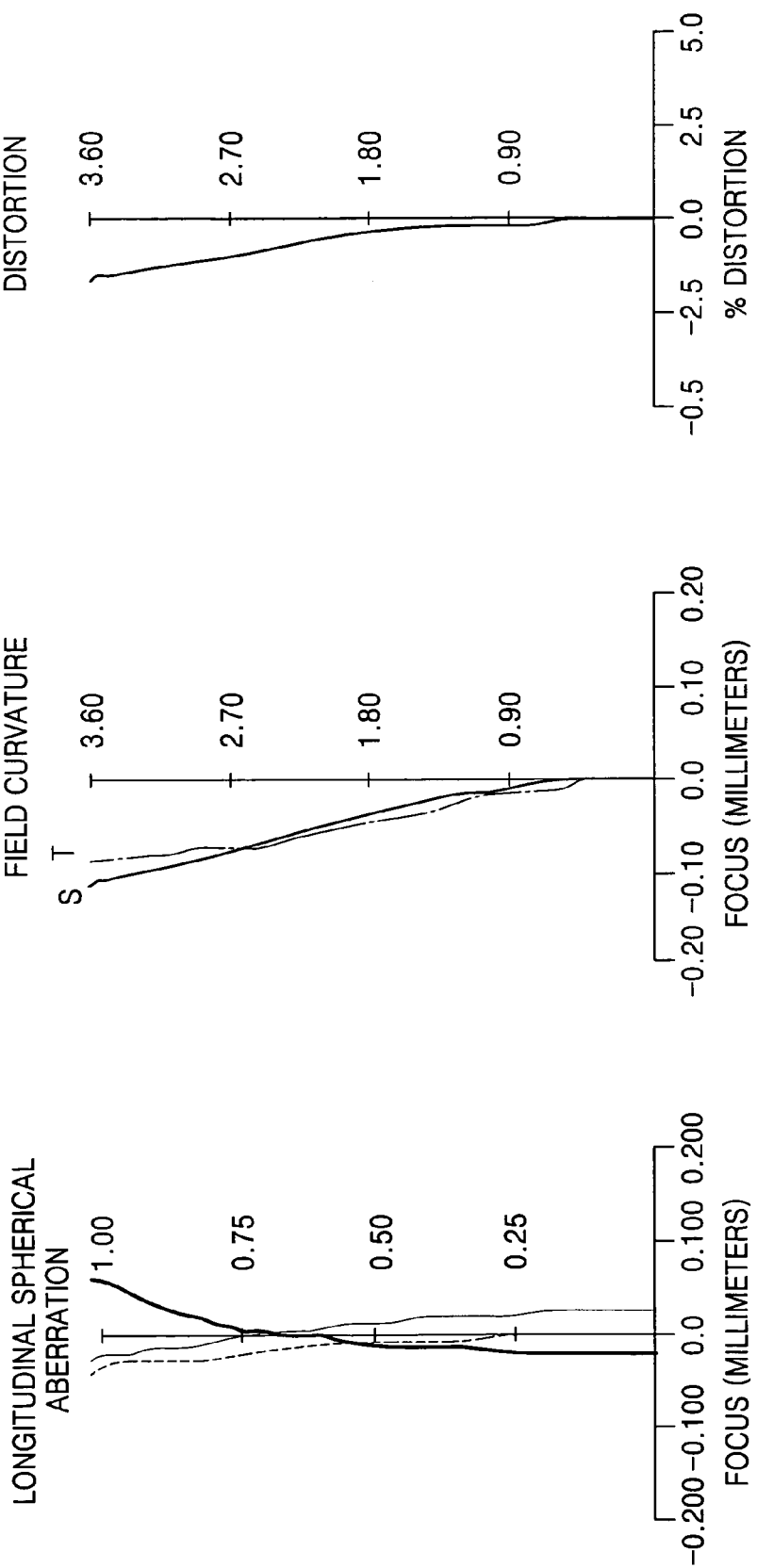
FIG. 6B illustrates longitudinal spherical aberration, field curvature, and distortion at the medium-angle position of the zoom lens according to the second embodiment of the present invention.
Figure 6C:
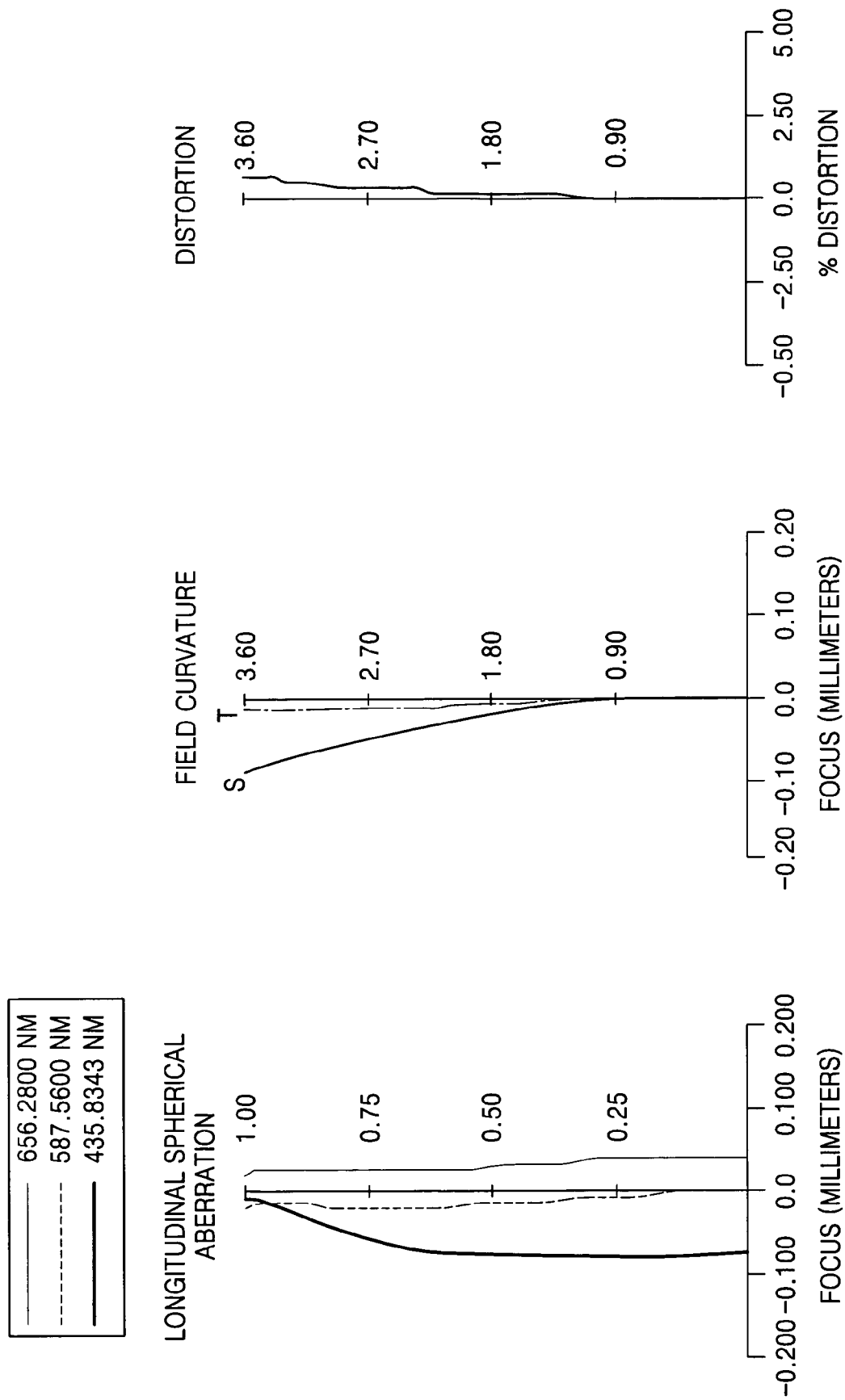
FIG. 6C illustrates longitudinal spherical aberration, field curvature, and distortion at the telephoto position of the zoom lens according to the second embodiment of the present invention.

FIG. 5 illustrates a zoom lens according to a second embodiment of the present invention. A first lens group 100 includes a first lens element 103 and a second lens element 104. A second lens group 110 includes a third lens element 114, a fourth lens element 115, and a fifth lens element 116. A third lens group 120 includes a sixth lens element 122.

| f: 5.9~9.82~16.65 | Fno: 2.88~4.10~5.08 | ω: 64.07~40.94~24.20 | |
|---|---|---|---|
| | R | Dn | ND | VD |
| S1: | 841.689 | 1.30 | 1.8050 | 40.7 |
| K: | 2.000000 | | | |
| | A: 0.107142E−02 | B: −0.429018E−04 | C: 0.961437E−06 | D: −0.853179E−08 |
| S2: | 5.85741 | 1.36 | | |
| K: | −4.055000 | | | |
| | A: 0.359485E−02 | B: −0.860710E−04 | C: 0.111085E−05 | D: 0.222441E−07 |
| S3: | 7.343 | 1.55 | 1.9229 | 20.9 |
| S4: | 13.139 | D1 | | |
| ST: | 4.300 | 2.00 | 1.8050 | 40.7 |
| K: | 1.026000 | | | |
| | A: −0.220142E−02 | B: −0.237598E−03 | C: 0.152701E−04 | D: −0.450708E−05 |
| S6: | −8.209 | 0.50 | 1.7282 | 28.3 |
| S7: | 3.486 | 0.48 | | |
| S8: | 10.413 | 1.00 | 1.6204 | 60.3 |
| S9: | −22.639 | D2 | | |
| S10: | 15.019 | 1.31 | 1.8830 | 40.8 |
| S11: | 89.589 | D3 | | |
| S12: | INFINITY | 1.00 | 1.5168 | 64.2 |
| S13: | INFINITY | 0.97 | | |
| IMG: | INFINITY | | | |

| f; 5.97~9.82~16.65 | | Fno; 2.87~3.64~5.17 | | ω; 64.07~40.86~24.23 | |
|---|---|---|---|---|---|
| | R | Dn | | ND | VD |
| S1: | −187.757 | 1.30 | | 1.85049 | 40.21 |
| K: | 0.000000 | | | | |
| | A: 0.114234E−02 | B: −0.392949E−04 | | C: 0.747895E−06 | D: −0.547134E−08 |
| S2: | 5.937 | 1.28 | | | |
| K: | −4.4676 | | | | |
| | A: 0.374402E−02 | B: −0.806182E−04 | | C: 0.601392E−06 | D: 0.290910E−07 |
| S3: | 7.505 | 1.63 | | 1.9229 | 20.9 |
| S4: | 15.585 | D1 | | | |
| ST: | INFINITY | 0.00 | | | |
| S6: | 4.48500 | 2.03 | | 1.8050 | 40.7 |
| K: | 0.729240 | | | | |
| | A: −0.173636E−02 | B: −0.859352E−04 | | C: −0.452989E−05 | D: −0.740483E−06 |
| S7: | −7.637 | 0.50 | | 1.7282 | 28.3 |
| S8: | 3.739 | 0.45 | | | |
| S9: | 14.991 | 1.00 | | 1.6204 | 60.3 |
| S10: | −15.485 | D2 | | | |
| S11: | 15.413 | 1.31 | | 1.8830 | 40.8 |
| S12: | 107.400 | D3 | | | |
| S13: | INFINITY | 1.00 | | 1.5168 | 64.2 |
| S14: | INFINITY | 0.96 | | | |
| IMG: | INFINITY | | | | |

Table 2 shows examples of the variable distances D1, D2, and D3 at the wide-angle position, the medium-angle position, and the telephoto position in the zoom lens according to the second embodiment of the present invention.

TABLE 2

| | Wide-angle | Medium-angle | Telephoto |
|---|---|---|---|
| D1 | 11.725 | 5.13 | 1.1 |
| D2 | 6.135 | 10.184 | 17.263 |
| D3 | 2.511 | 2.174 | 1.1 |

Third Embodiment

Figure 7:
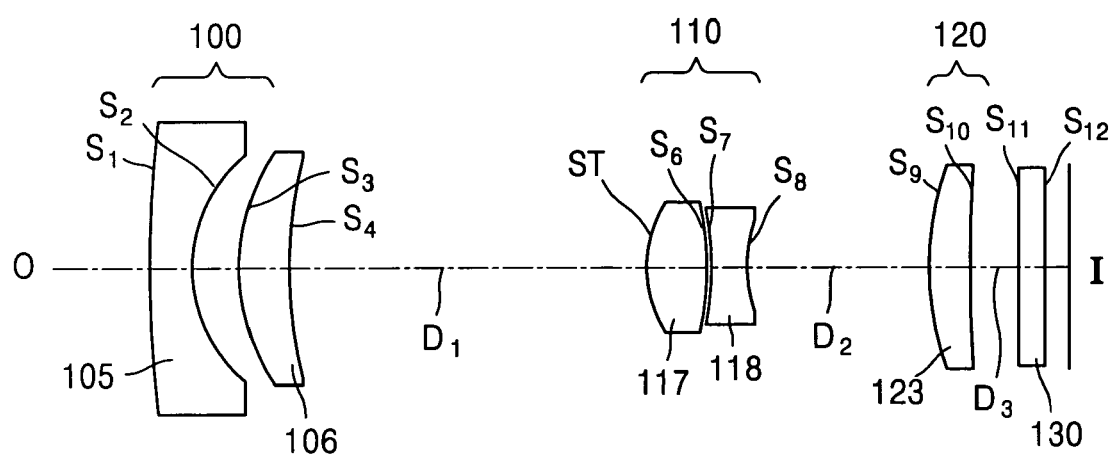
FIG. 7 illustrates a zoom lens according to a third embodiment of the present invention.
Figure 8A:
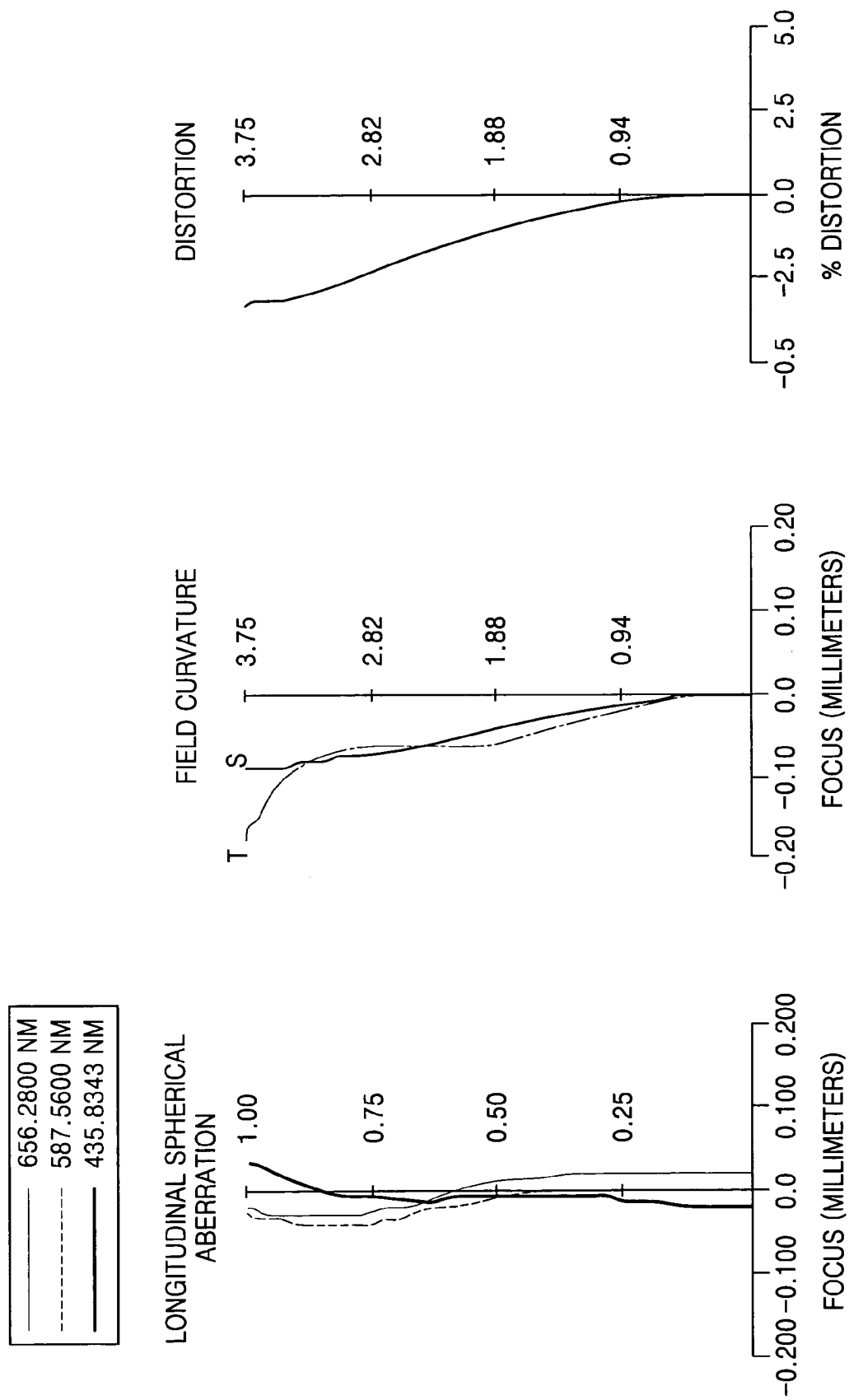
FIG. 8A illustrates longitudinal spherical aberration, field curvature, and distortion at the wide-angle position of the zoom lens according to the third embodiment of the present invention.
Figure 8B:
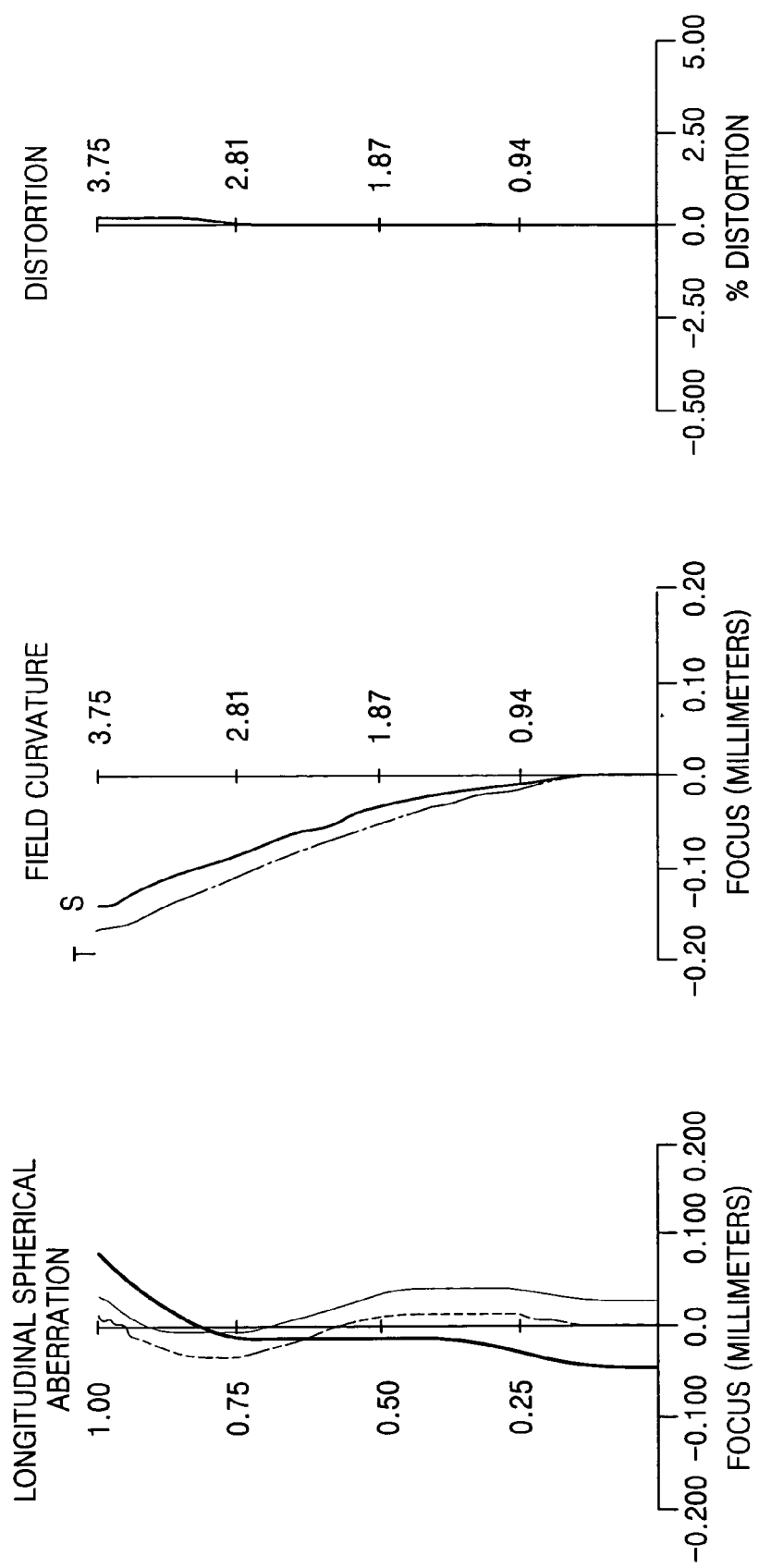
FIG. 8B illustrates longitudinal spherical aberration, field curvature, and distortion at the medium-angle position of the zoom lens according to the third embodiment of the present invention.
Figure 8C:
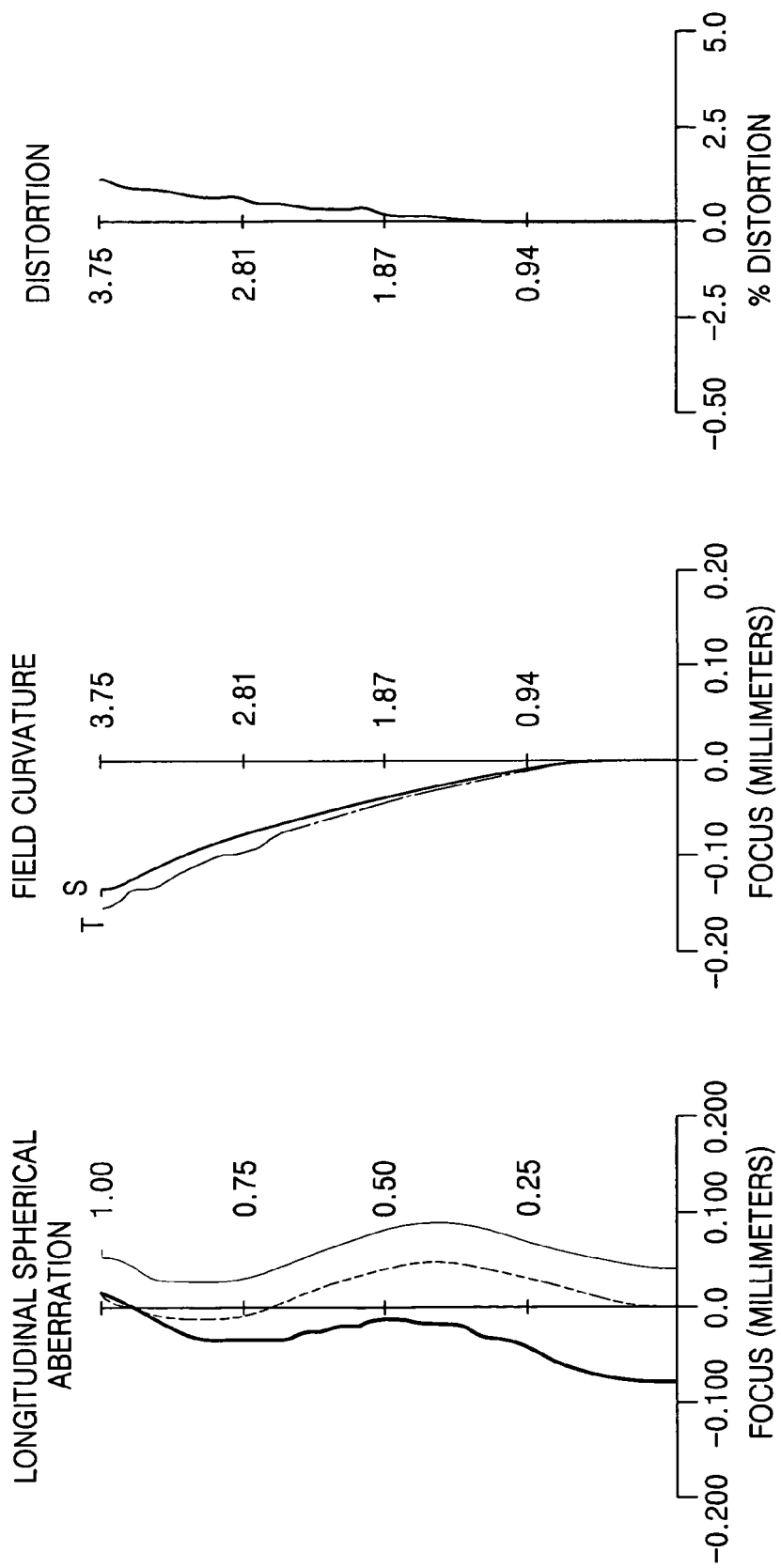
FIG. 8C illustrates longitudinal spherical aberration, field curvature, and distortion at the telephoto position of the zoom lens according to the third embodiment of the present invention.

FIG. 7 illustrates a zoom lens according to a third embodiment of the present invention. A first lens group 100 includes a first lens element 105 and a second lens element 106. A second lens group 110 includes a third lens element 117 and a fourth lens element 118. A third lens group 120 includes a sixth lens element 123.

| F: 6.48~12.66~18.15 | | Fno: 2.85~4.02~5.13 | | ω: 61.78~32.89~23.05 | |
|---|---|---|---|---|---|
| | R | Dn | | ND | VD |
| S1: | 44.17793 | 1.60 | | 1.8050 | 40.7 |
| K: | 7.510259 | | | | |
| | A: −0.207876E−04 | B: 0.107619E−05 | | C: 0.210487E−07 | D: −0.354918E−09 |
| S2: | 5.22476 | 1.84 | | | |
| K: | −1.187246 | | | | |
| | A: 0.577828E−03 | B: 0.498138E−05 | | C: 0.243998E−06 | D: −0.353499E−09 |
| S3: | 8.544 | 1.97 | | 1.9229 | 20.9 |
| S4: | 16.473 | D1 | | | |
| ST: | 4.51614 | 2.36 | | 1.69384 | 52.1 |
| K: | −0.437483 | | | | |

-continued

|  | A: 0.564446E−03 | B: 0.322114E−04 | C: −0.139507E−05 | D: 0.267105E−07 |
|---|---|---|---|---|
| S6 | −15.541 | 0.16 | | |
| S7: | −23.65359 | 1.504 | 1.83917 | 24.8 |
| S8: | 7.872 | D2 | | |
| K: | 8.040132 | | | |
|  | A: 0.141617E−02 | B: −0.156292E−04 | C: 0.313984E−04 | D: −0.5747816E−05 |
| S9: | 16.078 | 1.68 | 1.748577 | 35.6 |
| S10: | −3172.14200 | D3 | | |
| S11: | INFINITY | 1.00 | 1.5168 | 64.2 |
| S12: | INFINITY | 1.00 | | |
| IMG: | INFINITY | | | |

Table 3 shows examples of the variable distances D1, D2, and D3 at the wide-angle position, the medium-angle position, and the telephoto position in the zoom lens according to the third embodiment of the present invention.

TABLE 3

|  | Wide-angle | Medium-angle | Telephoto |
|---|---|---|---|
| D1 | 13.835 | 4.755 | 2.150 |
| D2 | 6.999 | 12.579 | 17.967 |
| D3 | 1.695 | 1.745 | 1.100 |

The zoom lenses according to the first through third embodiments satisfy conditions expressed by Equations (1) through (7), which is summarized in Table 4.

TABLE 4

|  | First embodiment | Second embodiment | Third embodiment |
|---|---|---|---|
| Equation (1) | 1.9229 | 1.9229 | 1.9229 |
| Equation (2) | 0.917 | 0.970 | 0.956 |
| Equation (3) | 0.512 | 0.541 | 0.588 |
| Equation (4) | 2.221 | 2.291 | 2.473 |
| Equation (5) | 1.455 | 1.382 | 1.379 |
| Equation (6) | 1.8050 | 1.8050 | 1.69384 |
| Equation (7) | 2.822 | 2.79 | 2.8 |

When a zoom lens is manufactured to satisfy the above-described equations according to the present invention, the zoom lens can be miniaturized and have excellent telecentricity and high magnification.

As described above, the present invention provides a zoom lens which has a small number of lenses needed by an imaging optical system using a solid-state image sensing device and thus can be made compact and thin and which has excellent telecentricity, high magnification, a micro-length for receiving the optical system, and high imaging performance.

What is claimed is:

1. A zoom lens system consisting of:
   a first lens group having a negative refractive power;
   a second lens group having a positive refractive power; and
   a third lens group having a positive refractive power,
   wherein the first through third lens groups are sequentially arranged from an object side toward an image side,
   the first, second, and third lens groups move when magnification changes between wide-angle and telephoto,
   a refractive index G1n of at least one lens element of the first lens group satisfies 1.92<G1n<2.00, and
   wherein when a distance that the second lens group moves when the magnification changes from the wide-angle position to the telephoto position is represented by $L_{II}$, a focal length of the zoom lens optical system at the wide-angle position is represented by $f_w$, and the focal length of the zoom lens optical system at the telephoto position is represented by $f_t$, $$0.8 < \frac{L_{II}}{\sqrt{f_t f_w}} < 1.0$$

is satisfied.

2. The zoom lens of claim 1, wherein when magnification changes from the wide-angle position to the telephoto position, the distance between the first lens group and the second lens group decreases and the distance between the second lens group and the third lens group increases.

3. The zoom lens of claim 1, wherein when the magnification changes from the wide-angle position to the telephoto position, the distance between the first lens group and the second lens group decreases, the distance between the second lens group and the third lens group increases, and the distance between the third lens group and a cover glass located at the image side decreases.

4. The zoom lens of claim 1, wherein the first lens group comprises two lens elements of which one lens element has a positive refractive power.

5. The zoom lens of claim 1, wherein the second lens group consists of two or three lens elements.

6. The zoom lens of claim 1, wherein the second lens group comprises three lens elements of which at least two lens elements are cemented forming a doublet, and the third lens group comprises a single lens element.

7. The zoom lens of claim 1, wherein the lens element of the first lens group closest to the object side has the refractive index G1n.

8. The zoom lens of claim 7, wherein the lens element in the second position closest to the object side has a positive refractive power.

9. The zoom lens of claim 1, wherein the first lens group comprises at least one lens element having an aspherical surface.

10. The zoom lens of claim 1, wherein when the refractive index of the lens element of the second lens group closest to the object side is represented by G2n, 1.69<G2n<1.95 is satisfied.

11. A digital imaging apparatus including an optical zooming lens system and a digital image sensor, where the optical zooming lens system consists of:
   a first lens group having a negative refractive power,
   a second lens group having a positive refractive power, and a third lens group having a positive refractive power,
wherein the first, second and third lens groups are respectively arranged from an object side toward an image side,
the first, second and third lens groups move when magnification changes between wide-angle and telephoto,
at least one lens element of the first lens group has a refractive index G1n which satisfies 1.92<G1n<2.00, and
wherein when a distance that the second lens group moves when the magnification changes from the wide-angle position to the telephoto position is represented by $L_{II}$, a focal length of the zoom lens optical system at the wide-angle position is represented by $f_w$, and the focal length of the zoom lens optical system at the telephoto position is represented by $f_t$, $$0.8 < \frac{L_{II}}{\sqrt{f_t f_w}} < 1.0$$

is satisfied.

12. A camera phone including a camera module according to the digital imaging apparatus of claim 11.

13. A zoom lens system consisting of:
a first lens group having a negative refractive power;
a second lens group having a positive refractive power; and
a third lens group having a positive refractive power,
wherein the first through third lens groups are sequentially arranged from an object side toward an image side,
the first, second, and third lens groups move when magnification changes between wide-angle and telephoto,
a refractive index G1n of at least one lens element of the first lens group satisfies 1.92<G1n<2.00, and
wherein when the distance that the second lens group moves when the magnification changes from the wide-angle position to the telephoto position is represented by $L_{II}$, the focal length of the second lens group is represented by $f_2$, and a refractive index of the lens element of the second lens group closest to the object side is represented by G2n, $$0.45 < \frac{(L_{II}/f_2)}{G2n} < 0.6$$

is satisfied.

14. A zoom lens system consisting of:
a first lens group having a negative refractive power;
a second lens group having a positive refractive power; and
a third lens group having a positive refractive power,
wherein the first through third lens groups are sequentially arranged from an object side toward an image side,
the first, second, and third lens groups move when magnification changes between wide-angle and telephoto,
a refractive index G1n of at least one lens element of the first lens group satisfies 1.92<G1n<2.00, and
wherein when the overall length of the zoom lens at the wide-angle position is represented by $D_w$ and the focal length of the first lens group is represented by $f_1$, $$2.0 < \frac{Dw}{|f_1|} < 2.5$$

is satisfied where $f_1<0$.

15. A zoom lens system consisting of:
a first lens group having a negative refractive power;
a second lens group having a positive refractive power; and
a third lens group having a positive refractive power,
wherein the first through third lens groups are sequentially arranged from an object side toward an image side,
the first, second, and third lens groups move when magnification changes between wide-angle and telephoto,
a refractive index G1n of at least one lens element of the first lens group satisfies 1.92<G1n<2.00, and
wherein when the overall focal length of the first lens group is represented by $f_1$ and the overall focal length of the second lens group is represented by $f_2$, $$1.3 < \frac{|f_1|}{f_2} < 1.5$$

is satisfied where $f_1<0$.

16. A zoom lens system consisting of:
a first lens group having a negative refractive power;
a second lens group having a positive refractive power; and
a third lens group having a positive refractive power,
wherein the first through third lens groups are sequentially arranged from an object side toward an image side,
the first, second, and third lens groups move when magnification changes between wide-angle and telephoto,
a refractive index G1n of at least one lens element of the first lens group satisfies 1.92<G1n<2.00, and
wherein when the magnification changes from the wide-angle position to the telephoto position, $$2.7 < \frac{f_t}{f_w} < 3.0$$

is satisfied where $f_w$ is the focal length at the wide-angle position and $f_t$ is the focal length at the telephoto position.

* * * * *